United States Patent [19]

Shovar

[11] Patent Number: 4,913,492

[45] Date of Patent: Apr. 3, 1990

[54] RECLINER FOR VEHICLE SEAT

[75] Inventor: J. Scott Shovar, Davenport, Iowa

[73] Assignee: Sears Manufacturing Company, Davenport, Iowa

[21] Appl. No.: 333,387

[22] Filed: Apr. 3, 1989

[51] Int. Cl.$^4$ .......................... B60N 1/02; A47C 3/00
[52] U.S. Cl. ..................................... 297/300; 297/355
[58] Field of Search ............... 297/300, 301, 302, 354, 297/355

[56] References Cited

U.S. PATENT DOCUMENTS

| | | | |
|---|---|---|---|
| 4,579,386 | 4/1986 | Rupp | 297/355 |
| 4,682,814 | 7/1987 | Hansen | 297/301 X |
| 4,756,575 | 7/1988 | Dicks | 297/301 |
| 4,758,045 | 7/1988 | Edel | 297/300 |

Primary Examiner—James T. McCall
Attorney, Agent, or Firm—Henderson & Sturm

[57] ABSTRACT

This invention provides a vehicle seat with improved reclining adjustments for operators. A recliner assembly (13) includes a recliner (34) supported between a rear tilt bracket (25) depending from the backrest assembly (11) and a front tilt bracket (29) depending from the front of seat assembly (12), the recliner assembly being disposed along the central longitudinal axis of the seat assembly and between the sides of the backrest assembly, whereby twisting of the backrest with respect to the seat is more effectively minimized and compensated for.

2 Claims, 2 Drawing Sheets

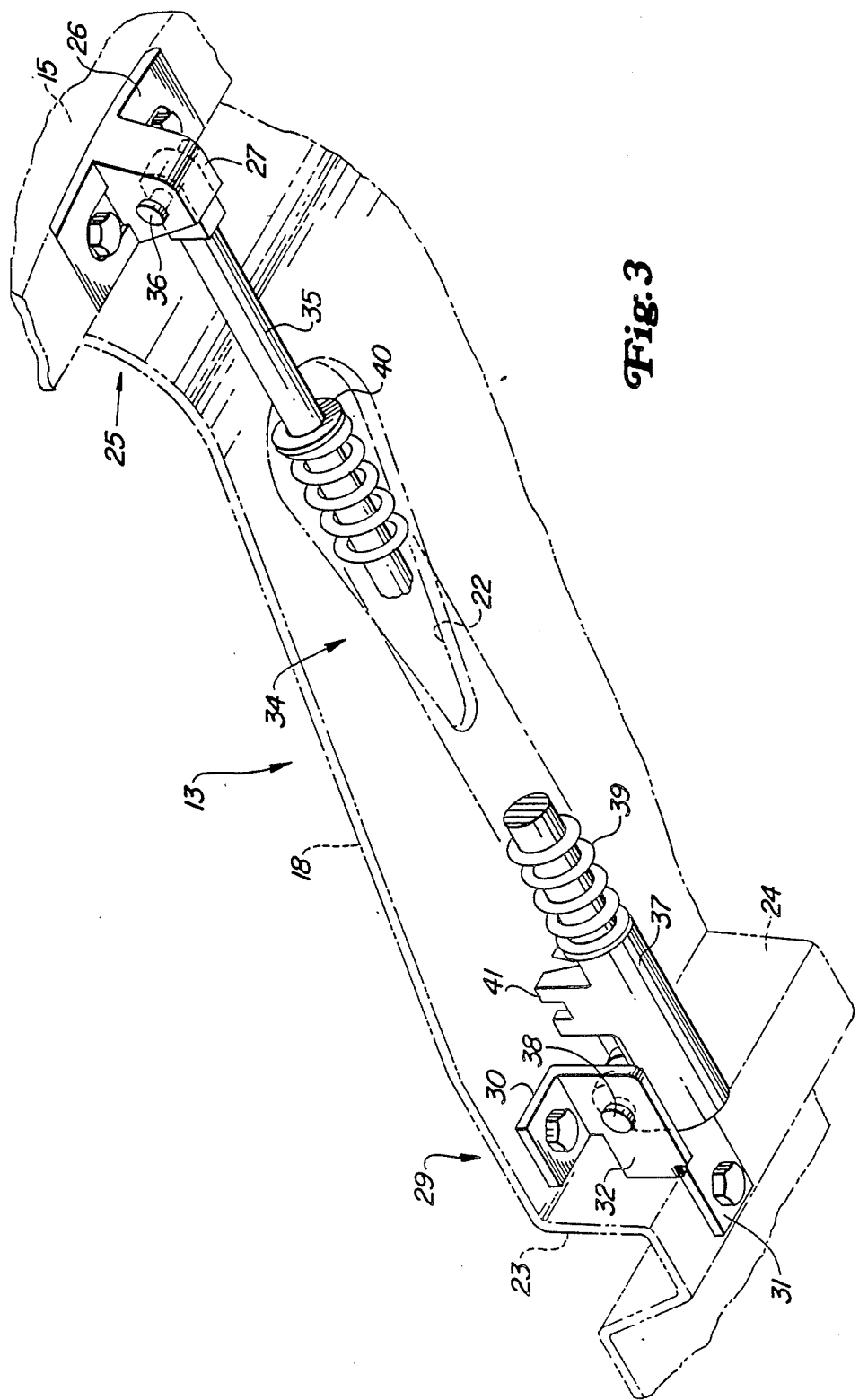

4,913,492

RECLINER FOR VEHICLE SEAT

TECHNICAL FIELD

This invention relates generally to vehicle seats. Specifically addressed are modifications of such seats which provide for an improved reclining mechanism.

BACKGROUND ART

Many vehicle seats have been provided with reclining mechanisms whereby the backrest portion of the vehicle seat is pivoted in some controlled fashion with respect to the seat portion. The obvious benefit from this is to enhance the fit of the vehicle seat to the operator, thereby enabling the operator to more effectively perform the function of controlling the vehicle.

Generally to date recliner mechanisms have been mounted to one side of the vehicle seat. Because that side of the backrest is secured more firmly to the seat portion, when operators push against the backrest to cause it to pivot backwardly with respect to the seat portion, the backrest tends to twist about the long axis of the recliner mechanism side of the backrest. Similar twisting motions are imparted when operators push on or against the backrest when they enter or exit the seat, boost themselves up into an overhead sleeper or the like.

To counter the aforementioned twisting, to prevent binding of the vehicle seat, generally backrests have been beefed up with transverse support structures. At least one seat has been equipped with recliner mechanisms disposed on both sides. The general result of these measures has been to bulk up the vehicle seat.

DISCLOSURE OF INVENTION

Addressing the needs described above, this invention provides a vehicle seat having a centrally mounted recliner mechanism. More specifically, a rear tilt bracket assembly depends from the lower central part of the backrest portion. A front tilt bracket assembly is fixed to the underside of the front central part of the seat portion. The recliner is mounted to the tilt brackets and extends along the central longitudinal axis of the seat portion.

The general object of this invention is to provide an improved vehicle seat.

A more specific object is provision of a vehicle seat with an improved recliner mechanism.

A further object is provision of a recliner mechanism in such fashion that the need for built-in support structures, such as in the backrest portion, is reduced.

Also an object is provision of a recliner mechanism which enables the vehicle seat to be less bulky, thereby resulting in a more spacious operator environment.

These objects and other features and advantages of this invention will become readily apparent upon referring to the following description in conjunction with the drawings.

BRIEF DESCRIPTION OF THE DRAWINGS

This invention of a recliner for vehicle seat is illustrated in the drawings wherein:

FIG. 3 is an enlarged, fragmentary, rear perspective view of the underside of the vehicle seat showing recliner assembly details.

BEST MODE FOR CARRYING OUT THE INVENTION

Figure 1:
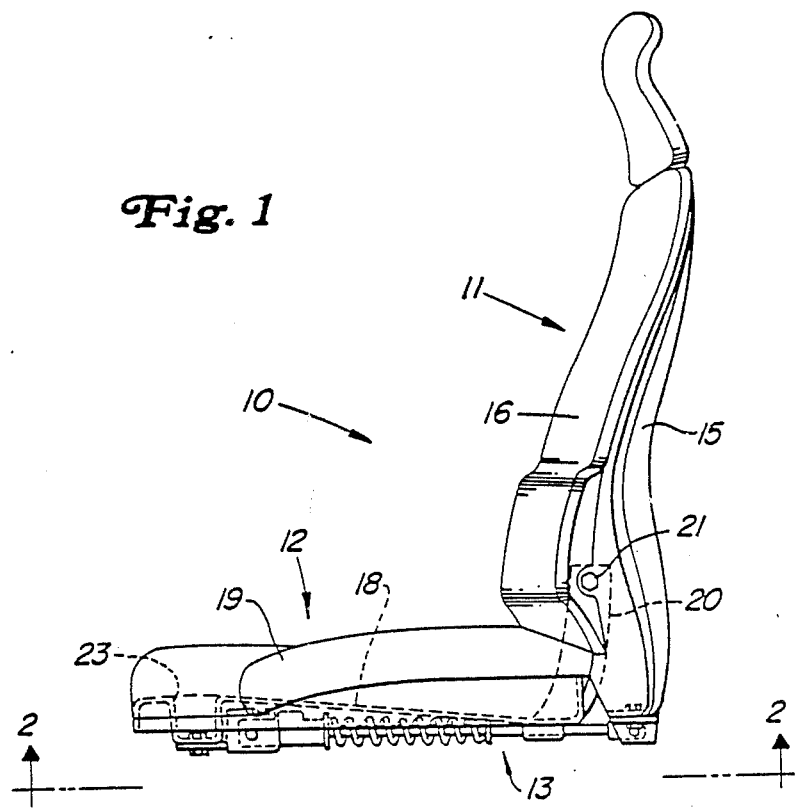
FIG. 1 is a side elevational view showing a vehicle seat incorporating this invention.
Figure 2:
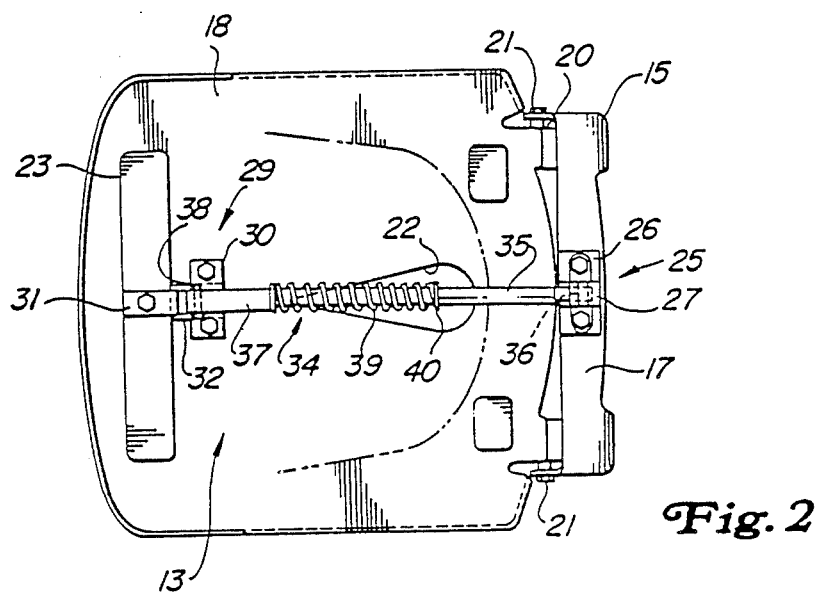
FIG. 2 is a bottom plan view, taken along line 2—2 in FIG. 1.

The vehicle seat is shown generally at (10) in FIG. 1. The seat (10) more particularly includes a backrest assembly (11), seat assembly (12) and recliner assembly (13).

The backrest assembly (11) includes a formed back pan (15). The usual upholstery covered foam (16) is mounted to the back pan (15).

The seat assembly (12) includes a formed seat pan (18). Upholstery covered foam parts (19) are attached to the seat pan (18) in the normal fashion. Formed at the rear edge of seat pan (18) is an upwardly extending member (20). Transversely spaced pivot attachment points (21) are formed into member (20) adjacent the upper end thereof, and the backrest assembly (11) is pivotally attached to the seat assembly (12) at these points (21).

The seat pan (18) generally drops downwardly from the front to the rear, and a tear-shaped relief (22) is formed through the pan (18). The relief (22) is widest toward the rear, and tapers toward the front of pan (18). The relief (22) is disposed along the central longitudinal axis of the pan (18). A transversely disposed, downwardly extending channel (23) is formed into pan (18) adjacent the front end thereof.

The recliner assembly (13) in general includes rear tilt bracket (25), front tilt bracket (29) and recliner (34). The rear tilt bracket (25) more particularly includes a first flange part (26) fixed to the bottom, transversely extending flange (17) of back pan (15). A mounting member (27) depends from flange part (26). The bracket (25) is positioned intermediate to the sides of back pan (15).

The front tilt bracket (29) more particularly includes a first flange part (30) fixed to the underside of seat pan (18) immediately rearwardly of the channel (23). A second flange part (31) is fixed to the underside of the channel (23). An intermediate mounting member (32) joins the flange parts (30, 31) and butts against the rearwardly disposed depending wall (24) of channel (23). The bracket (29) is disposed intermediate the sides of seat pan (18).

The recliner (34) includes an extended rod (35) pivotally mounted at (36) to depending member (27). The recliner body (37) receives the opposite end of rod (35) and is pivotally attached at (38) to mounting member (32). A forward biasing spring (39) fits over rod (35) and presses against body (37) and the member (40) fixed to the rod (35). A standard button actuated cable release mechanism or the like (not shown) attaches at (41) to a standard mechanism for locking the rod (35) against movement with respect to body (37). When mounted to brackets (25, 29) the recliner (34) is disposed along the central longitudinal axis of the seat pan (18).

In operation, the rod (35) is unlatched with respect to the body (37). If the operator wishes the backrest (11) to pivot to a more upright position, the operator simply bends forward to the desired position, and extension of rod (35) by spring (39) causes the backrest (11) to pivot to the newly assumed operator position, at which time the operator again locks the recliner (34). To assume a more reclined position, the operator leans against the backrest (11) while the recliner (34) is unlocked, again relocking the recliner (34) when the desired position is attained. Because the recliner assembly (13) is located along the central longitudinal axis of the seat assembly (12) and intermediate the sides of backrest assembly (11), these operator motions result only in minimal twisting of the backrest (11) with respect to the seat (12). The transverse channel (23) and bottom transverse flange (17) in addition to providing attachment for the recliner (34) also serve to strengthen the seat pan (18) and back pan (15), nevertheless, the overall number of transverse support structures is substantially reduced. The channel (23) further may serve as a space wherein are stored additional structures which can provide for auxiliary seat adjustments, for example, pivoting of the upholstery covered foam parts (16) immediately above for better thigh support. The overall bulk of the vehicle seat (10) is significantly reduced.

The industrial applicability of this seat invention is believed to be apparent from the foregoing description. Although a preferred embodiment has been disclosed herein, it is to be remembered that various alternate constructions can be made thereto without departing from the scope of this invention.

I claim:

1. A vehicle seat comprising:

a unitary seat pan, having formed therein adjacent the front end thereof a depending seat pan part which substantially transversely spans said seat pan and which defines an upwardly opening channel, and having a seat pan rear end part which substantially spans said seat pan and extends generally upwardly, transversely spaced pivot attachment points being formed into said seat pan rear end part adjacent the terminal free end thereof;

a unitary backrest pan, having upper and lower ends, pivotally attached intermediate said ends to said pivot attachment points, and having formed at said lower end a flange which substantially transversely spans said backrest pan; and recliner means including a front pivot mount fixed to said depending seat pan part, a rear pivot mount fixed to said backrest pan flange, and a recliner mechanism extending between said front and rear pivot mounts generally immediately below, and intermediate the sides of, said unitary seat pan.

2. The vehicle seat of claim 1 wherein said unitary seat pan has a relief cut therethrough between said depending seat pan part and said seat pan rear end part, said recliner mechanism extending into said relief.

* * * * *